June 29, 1926.  
E. G. COZAD  
MEASURING INSTRUMENT  
Filed Feb. 17, 1925  
1,590,499  
2 Sheets-Sheet 1

Inventor  
Ester G. Cozad

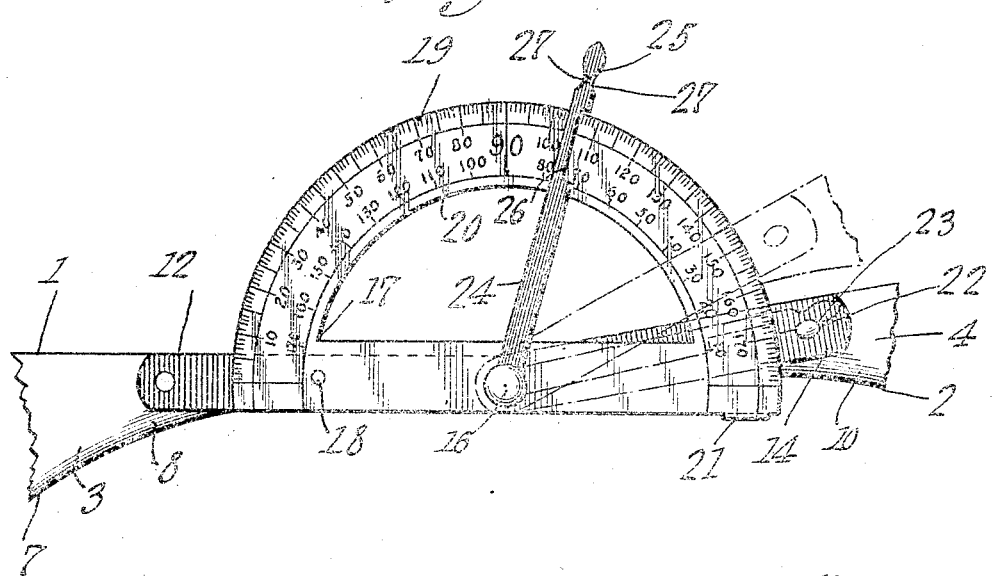
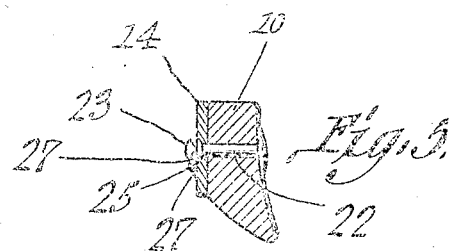
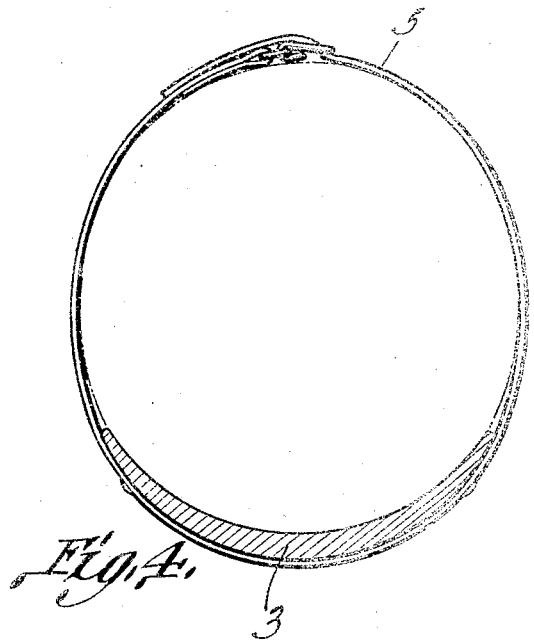
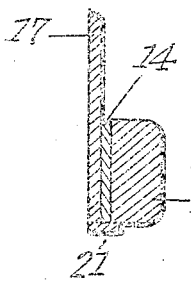

Patented June 29, 1926.

1,590,499

UNITED STATES PATENT OFFICE.

ESTER G. COZAD, OF CORRY, PENNSYLVANIA.

MEASURING INSTRUMENT.

Application filed February 17, 1925. Serial No. 9,817.

By way of explanation, it may be stated that pathological conditions often require the manipulation of the joints in the human body, and, the foregoing being understood, this invention aims to provide a novel means whereby the angle between extreme flexure and extreme extension may be read quickly and accurately.

It is within the province of the disclosure to improve generally, and to enhance the utility of, devices of that sort to which the invention appertains.

Although a preferred form has been shown, it will be understood that a maker of surgical instruments, working within the scope of what is claimed, may resort to such alterations as his skill may suggest, without departing from the spirit of the invention.

In the accompanying drawings:—

Figure 3 is a side elevation on an enlarged scale, wherein parts are broken away;

Figure 4 is a section on the line 4—4 of Figure 1;

Figure 5 is a section on the line 5—5 of Figure 1;

Figure 6 is a fragmental transverse section introduced for the purpose of showing the stop which limits the movement of certain parts of the device to an angle of 180°.

Since the novelty in the device hereinafter described, resides in its mechanical features, and in view of the fact that this specification is addressed to a person skilled in the art, it is not necessary to set forth in detail, all of the uses to which the invention may be put. The device may be used to obtain a reading as to the angle to which any member of the human body may be flexed or extended, but, for the sake of illustration, it will be supposed that the instrument is to be employed for measuring the angle between the upper arm and the forearm.

Figure 1:
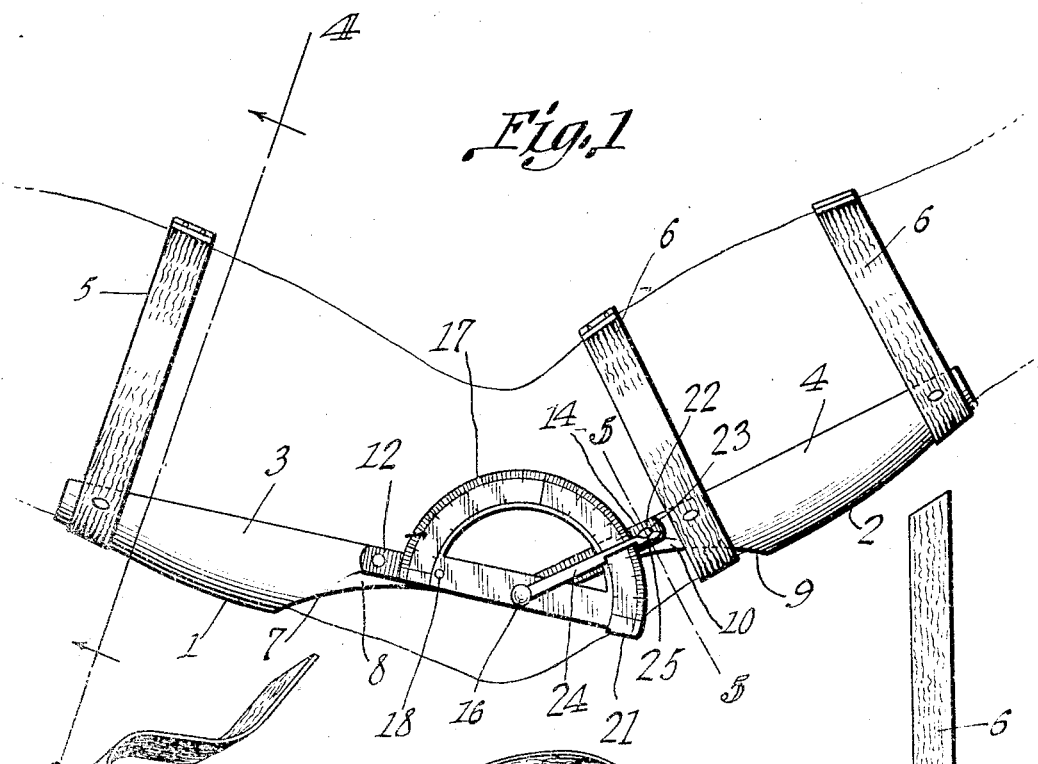
Figure 1 shows in elevation, a device constructed in accordance with the invention and attached to a human arm, the parts being in the positions which they will assume when a reading for extension is to be made.
Figure 2:
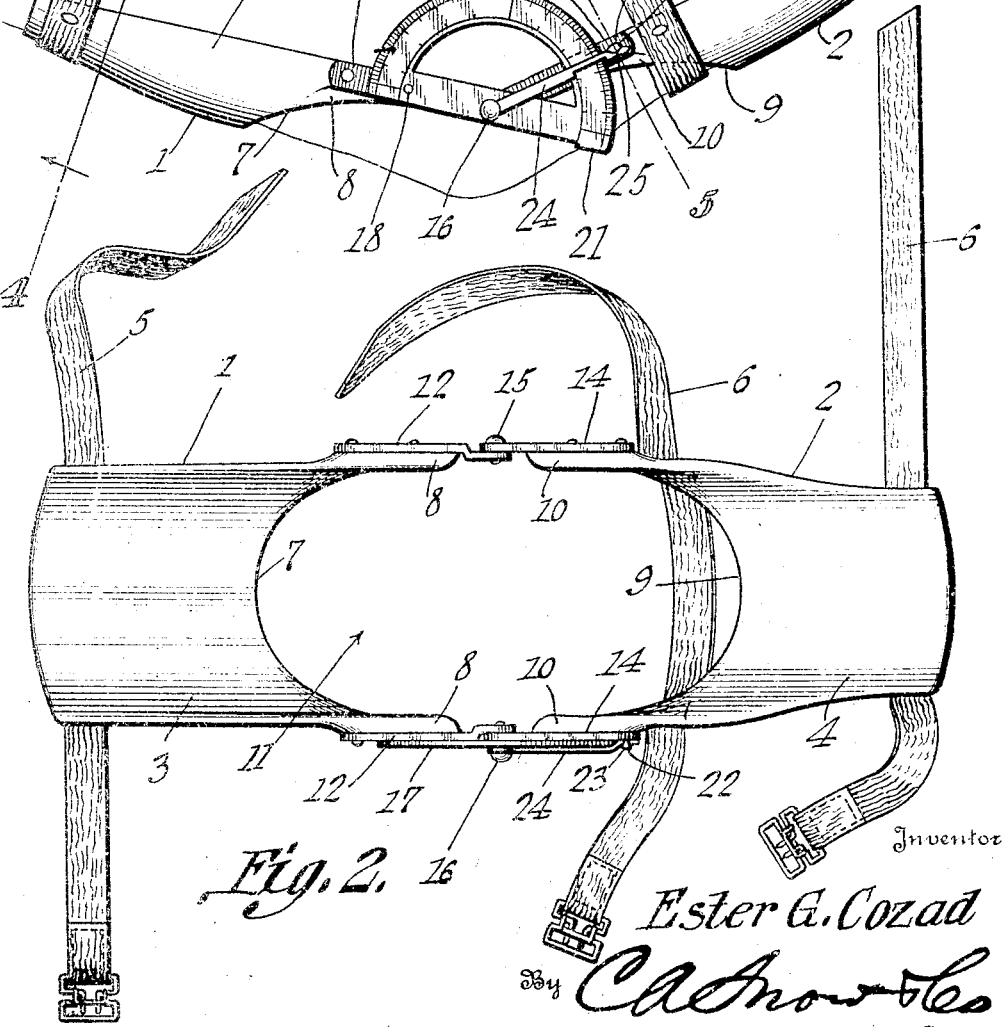
Figure 2 shows the device in plan, detached from the arm of the patient.

The device forming the subject matter of this application comprises hingedly connected parts 1 and 2, so constructed as to be adaptable to any joint-forming elements in the human body, for instance, the upper arm and forearm. The part 1 is shown as embodying a trough-shaped member 3, the part 2 embodying a trough-shaped member 4. The member 3 is adapted to be secured by a strap and buckle 5, or in any other suitable way, to the upper arm, the member 4 being secured by straps and buckles 6, or otherwise, to the forearm. At its inner end, the member 3 is cut away as at 7 to form extensions 8, the member 4 being cut away at its inner end, as at 9, to fashion extensions 10, there being an opening 11 in the intermediate portion of the device, through which the elbow of the patient is adapted to extend, as shown in Figure 1. Hinge plates 12 are secured to the extensions 8 of the member 3, hinge plates 14 being attached to the extensions 10 of the member 4, the inner ends of the hinge plates 12 and 14 being connected, at opposite sides of the device, by pivot elements 15 and 16.

A protractor 17 is held by a securing member 18 and by the pivot element 16 on one of the hinge plates 12 of the member 3. The protractor has an outer scale 19 and an inner scale 20, preferably reading in degrees, from opposite directions. The scale graduations are omitted from the protractor 17 in Figure 1, owing to the fact that that figure is somewhat small. At one end, the protractor 17 has an inwardly extended stop 21, shown in Figures 3 and 6, and adapted to coact with one of the extensions 10 and the corresponding hinge plate 14, to limit the opening movement of the instrument to an angle of 180°. One of the securing elements 22 which attach one of the hinge plates 14 to the corresponding part 10 of the member 4 has an added function in the operation of the device. The securing element 22 has an outwardly projecting under cut head 23 adapted to engage the reduced neck 25 of an indicator or arm 24 mounted to swing on the pivot element 16 and cooperating with the scales 19 and 20 of the protractor 17, the indicator having some resiliency, and having a frictional contact with the protractor 17, so that the indicator will remain in any position to which it may have been swung. The neck 25 of the protractor is beveled, as at 27, so as to engage beneath the under-cut head or projection 23, the construction being such that the indicator will not be likely to be disengaged from the projection during the operation of the device. The base line 26 of a recess in the indicator 24 is the fiducial part of the indicator and coacts with the scales 19 and 20. Owing to the fact that the indicator has the reduced neck 25, the error in reading either of the scales 19 and 20 will be negligible, for all practical purposes, regardless of whether the head or projection 23 engages one side of the neck or the opposite side thereof.

When a reading is to be secured for extension, the forearm is swung clockwise as in Figure 1, the head or projection 23 carrying the indicator 24 to a position in which the scale 20 may be read along the part 26 of the indicator, the forearm being swung counter-clockwise, to carry the projection 23 away from the indicator 24, the indicator being frictionally held in position on the protractor.

When a reading is to be secured for flexure, the resilient indicator 24 is sprung over the projection, from the position shown in Figure 1 to the position shown in Figure 3 and when the forearm is swung counter-clockwise and then clockwise, the indicator 24 will be left in the position shown in solid line in Figure 3, so that a flexure reading may be obtained from the scale 19.

What is claimed is:—

1. A device for measuring the angle between relatively movable joint-forming elements in the human body, comprising hingedly connected members so constructed as to fit upon the joint-forming elements, a protractor mounted on one of said members, an index, means for mounting the index for swinging movement, and a projection on the other of said members and adapted to engage the index to cause the index to cooperate with the protractor, the index being resilient, to the end that it may be disposed on either side of the projection.

2. A device for measuring the angle between relatively movable joint-forming elements in the human body, comprising hingedly connected members so constructed as to fit upon the joint-forming elements, a protractor mounted on one of said members; and coacting parts comprising an index cooperating with the protractor, and a projection on the other of said members and adapted to engage the index to cause the same to move over the protractor, one of said coacting parts being yieldable, so that the index may be disposed on opposite sides of the projection.

In testimony that I claim the foregoing as my own, witness my hand.

ESTER G. COZAD.